Dec. 19, 1944. P. G. COX 2,365,525
SELF-CLEANING FILTER ELEMENT
Filed July 9, 1941
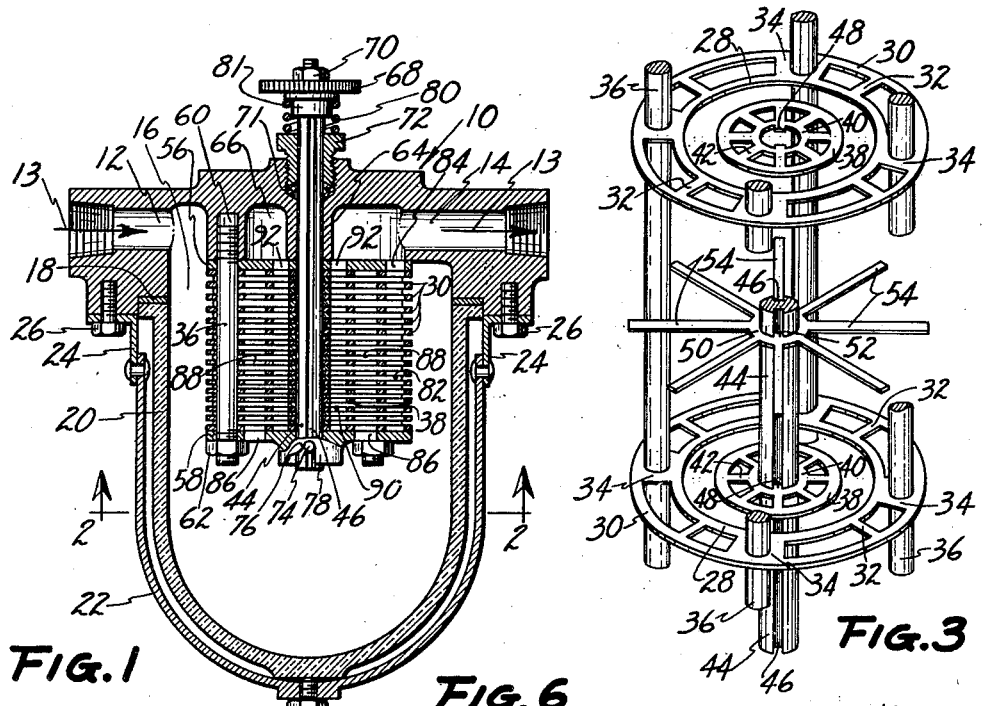
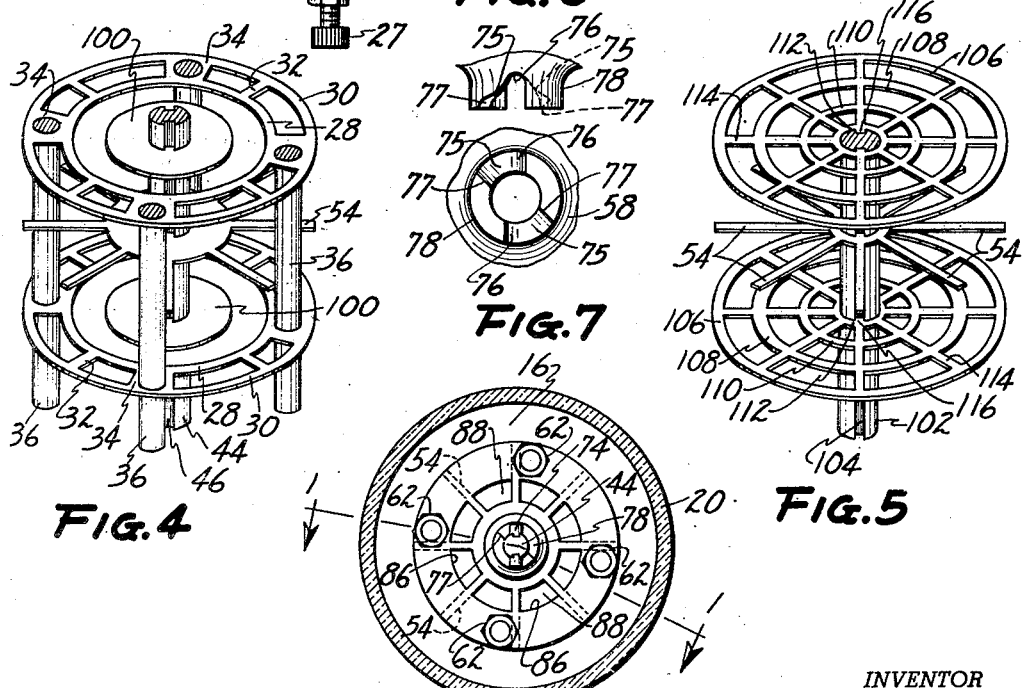
INVENTOR
PARKER G. COX
BY
ATTORNEY Patented Dec. 19, 1944

2,365,525

UNITED STATES PATENT OFFICE 2,365,525

SELF-CLEANING FILTER ELEMENT

Parker G. Cox, Detroit, Mich., assignor to Bendix Aviation Corporation, South Bend, Ind., a corporation of Delaware Application July 9, 1941, Serial No. 401,567

14 Claims. (Cl. 210—167)

This invention relates generally to apparatus for filtering fluids and has particular reference to filters of the edge type for filtering gasoline, oil or the like.

Edge type filters are built up of different forms of stamped elements arranged in a recurring order, the fluid to be filtered passing through the spaces between said elements of the built-up or assembled filter, said spaces constituting narrow circumferential slots or openings in the stack.

A difficulty encountered with this type filter is that dirt particles and other foreign matter entrained in the fluid being filtered tend to lodge and accumulate in said slots and clog them, thereby reducing the capacity and effectiveness of the filter. It is an important object of the present invention to provide a filter having means for readily and easily removing the accumulated foreign matter lodged between the filtering elements without disassembling the device.

It is another object of the invention to provide a filter of this character wherein the cleaning means is built into the device.

Another object of the invention is to provide a device of this character wherein certain of the elements of the filter stack are movable relative to certain other elements for scraping clean the filtering surfaces thereof.

Still another object of the invention is to provide a device of this character whereby the movable pieces may be releasably secured against said movement.

A further object of the invention is to provide a filter stack having a large filtering capacity.

Still further objects of the invention reside in the relative simplicity of construction and operation of the device; in the relative inexpensiveness to manufacture same; and in the details of construction of the filtering elements, their assembly and mounting to form the filter.

The characteristics and advantages of the invention are further sufficiently referred to in connection with the following detailed description of the accompanying drawing, which represent certain preferred embodiments. After considering these examples, skilled persons will understand that many variations may be made without departing from the principles disclosed; and I contemplate the employment of any structures, arrangements, or modes of operation that are properly within the scope of the appended claims.

Referring to the drawing:

Figure 1 is a vertical section through a filter assembly embodying the invention taken on line 1—1 of Figure 2;

Figure 2 is a horizontal section taken on line 2—2 of Figure 1;

Figure 3 is an enlarged isometric view showing the mode of mounting the various elements of the filter element;

Figure 4 is a similar view of a modified embodiment of the invention;

Figure 5 is a similar view of another modification of the device without the scraper or cleaning means;

Figure 6 is a partial enlarged side elevation of the grooved boss at the lower end of the assembled filter stack shown in Figure 1; and Figure 7 is an end view of the same.

Throughout the drawing and specification similar reference numerals refer to similar parts although where such parts are modified in structure and operation they are given a further differing reference character.

Referring more particularly to Figures 1, 2 and 3 the filter assembly comprises a filter head 10 having an inlet 12 and an outlet 14 which may be connected into a fluid flow conduit, the direction of flow being indicated by arrows 13. The head is annularly recessed at 16 and is provided with an annular shoulder having a gasket 18 against which is received the edge of a sediment bowl or receptacle 20 preferably of transparent material such as glass which is secured to the head 10 by a clamp or U-shaped stirrup 22. The ends of the stirrup are pivoted to brackets 24 secured to the head by screws 26 and a screw 27 is provided for tightening the bowl 20 against gasket 18. Removal of the cup for cleaning out sediment therein is effected by loosening screw 27 and swinging the stirrup from beneath said cup.

The filter stack comprises a large perforated washer element having arcuate perforations bounded by inner and outer rings 28 and 30 respectively and integral connectors 32 and 34 spaced annularly apart. The connectors 34 are enlarged and provided with openings through which pass supporting rods 36. A small perforated washer element is centrally disposed within each large perforated washer element in spaced relation to the inner ring 28 thereof, said small perforated washer element having arcuate perforations bounded by a ring 38 and a central portion 40 and integral connectors 42. The central portion 40 of each small perforated washer element is perforated and is slidably received on a stem 44 having diametrically opposed longitudinally extending grooves 46 in which are received ears 48 formed integral with said portion 40 thereby providing for rotation of the small perforated washer element by the stem 44. A plurality of large and small perforated washer elements are stacked on the rods 36 and stem 44 respectively and interposed between each large and small perforated washer element is a rimless spacer washer or star element comprising a centrally perforated hub 50 slidably received on the stem 44 and held against rotation thereon by ears 52 formed integral with the hub and received in the grooves 46. Radial arms 54, integral with the hub 50, extend to or slightly beyond the outer edges or rims of the large perforated washer elements, the hub portion of the star elements being separated by the small wheel washers an amount equal to the thickness of the large perforated washer elements, both large and small perforated washer elements being of the same thickness.

The assembled filter stack is provided at each end with a relatively thick plate 56 and 58 respectively. As shown in Figure 1 the upper ends of rods 36 are threaded and screwed into holes 60 in the filter head 10. The lower ends of said rods extend through plate 58 and are threaded to receive nuts 62, the tension or compression of the stack being determined by the tightness of said nuts. The stem 44 extends through a boss 64 depending in a chamber 66 communicating with outlet 14 and closed at the lower end by plate 56, said stem having a knurled head 68 secured on the upper free end thereof by a nut 70. Packing 71 about the stem, secured by a packing nut 72, prevents leakage of fluid about said stem. The lower end of stem 44 extends through the plate 58 and is provided with a pin 74 projecting laterally thereof, said pin being received in a notch 76 in an integral boss 78 of plate 58 and a spring 80, reacting between bushing 72 and head 68, yieldingly urges the stem upwardly so that pin 74 is normally seated in the notch 76. A collar 81 limits inward movement of shaft 44 so that pin 74 will not be moved outwardly from the end of boss 78. When the stem is latched against rotation by the seating of the pin 74 in the notch 76 the radial arms 54 of the star elements are aligned in normal relationship with the radial connectors 32 and 42 of the large and small washer elements respectively thereby forming partitions extending longitudinally of the filter stack. The boss 78 has oppositely arranged cam surfaces 75 on which the respective ends of pin 74 are adapted to slide and stop portions 77 in the path of the ends of said pin 74 limits rotation of stem 44.

The operation of the device hereinabove described is as follows:

Fluid entering passage 12 passes into the bowl 20 from which it passes through the filter stack and leaves the filter through passage 14. In passing through the filter stack part of the fluid enters the stack from the sides, flowing through the circumferential slots between the closely spaced rings 30 of the large perforated washer element and passing thence upwardly through arcuate passages or channels 82 substantially parallel with the axis of the stack and through openings 84 in the plate 56 and into chamber 66. It should be noted that channels 82 are closed at the bottom by the plate 58. Another course or path of fluid flow through the filter stack is through arcuate openings 86 in the lower plate 58 and upwardly in arcuate channels 88. Part of this fluid then flows between the closely spaced rings 28 of the large perforated washer elements and enters channels 82 and thence to chamber 66. The rest of the fluid entering channels 88 flows between the rings 38 of the small perforated washer elements and thence through longitudinal arcuate channels 90 (closed at the bottom by plate 58), openings 92 in plate 56 and into chamber 66. All the fluid entering chamber 66 leaves the filter by way of passage 14.

While it is preferred that the fluid enter passage 12 and leave by way of passage 14 the direction of flow may be reversed if desired.

Cleaning accumulated foreign matter from between the rings of the perforated washer elements is effected by depressing stem 44 to disengage pin 74 from notch 76 and rotating the stem back and forth, the pin 74 moving over the cam surfaces 75. The stops 77 are so located as to limit rotation of the shaft 44 and prevent the arms of the star elements from striking the rods 36 thus preventing deformation of said arms by forcible contact with said rods. By inclining cam surfaces 75 toward the inner end of slot 76 the pin 74 will normally slide into the slot and be yieldingly retained there by spring 80. As shown in the drawing the rotative movement of the star elements is approximately within 45 degrees, however, by a different arrangement of rods 36 different degrees of rotation may be effected. As the star elements are rotated the arms 54, which are snugly but slidably held between the perforated washer elements, scrape accumulated foreign matter from the surfaces of the rings 28 and 30. Thus filtering surfaces of the stack may be cleaned without dis-assembly thereof.

The modification of the device shown in Figure 4 is similar in construction to the hereinbefore described filter except that in said modification the central perforated washer element comprises a solid washer 100 which separates or spaces apart the stem elements. The operation of said modification is the same as the first described embodiment except as modified by the use of said solid washer.

By modifying the device as shown in Figure 5 a large capacity filter element with large filtering areas is provided. However, this embodiment of the invention does not possess the cleaning feature of the embodiments shown in Figures 1 to 4.

The filter stack shown in Figure 5 comprises perforated washer and star elements alternately arranged on a stem 102 having diametrically opposed longitudinally extending grooves 104. The star elements are the same as those hereinbefore described. However, the perforated washer elements comprise three concentric rings 106, 108, and 110, a central portion 112, and integral connectors 114 between the respective rings and central portion. The stem 102 passes through the central portion 112 and ears 116 integral therewith are received in the grooves 104 of said stem thereby maintaining the proper alignment of the elements in the stack. The star elements merely act as spacers between the perforated washer elements and any suitable means may be used to secure the assembled elements of the stack. The paths of fluid flow through the stack are the same as those shown in Figure 1. However in any embodiment of the device the path or paths of flow may be arranged otherwise than as shown and described herein. The flow may, for example, be from the periphery of the stack inwardly between the successive rings or vice versa.

Should it be desired to provide a device wherein the arms of the star element will scrap the surfaces of all the rings of the wheel elements the latter may be formed as shown in Figure 5 with such modifications as are necessary to bind same together and prevent rotation of the perforated washer elements by the stem or otherwise, and at the same time permit rotation of said star elements.

While the invention has been described with reference to specific embodiments, it is not intended to limit the scope thereof to the details disclosed or otherwise than by the terms of the appended claims.

I claim:

1. In a filter for fluids, a head having fluid passages therein, a receptacle secured in the path of the fluid between said passages, a filter stack interposed between said passages, said stack comprising alternately arranged superposed perforated washer elements and radially armed star elements, said perforated washer elements having registered openings therein to form longitudinal channels substantially parallel to the axis of the stack, means for holding said perforated washer elements against rotation and for maintaining said registrations, a stem axially arranged in the stack and rotatable relative to the perforated washer elements, means connecting the star elements and the stem whereby the former may be rotated by the latter, and releasable means for positioning and holding the stem in a predetermined position whereat the arms of the star elements will not obstruct the longitudinal channels.

2. In an edge type filtering stack, a plurality of perforated washer elements having peripheral filtering rings, radial connectors integral with the rings and connecting same together, radially armed spacer elements between the perforated washer elements, said connectors and radial arms normally being aligned and forming partitions extending longitudinally of the stack, means holding the perforated washer elements against rotation, means for rotating the spacer elements relative to the perforated washer elements, and means tending to effect realignment of the arms of the spacer elements and the connectors when the spacer elements are rotated to a position whereat said arms are out of alignment with said connectors.

3. In an edge type filtering stack, a plurality of stacked perforated washer elements, said washer elements having a peripheral ring and inwardly extending radial members circumferentially spaced apart, rimless spacer elements between the washer elements having radial arms spaced similarly to the members of the washer elements, means for holding the washer and spacer elements in operative position, the spacer elements and the rims of the washer elements at least partially defining longitudinal channels in the stack, means closing the channels at one end of the stack, means adapted to rotate one type of elements relative to the other type, and means for releasably latching the spacer elements in a position whereat said arms are in alignment with the radial members of the washer elements.

4. A filter for fluids, comprising a head having an inlet passage and an outlet passage, a bowl secured to the head and connecting said passages, a filter stack within the bowl having one end secured to the head and having a longitudinal axis, said stack comprising a plurality of superposed alternately arranged washers and rimless spacer elements, said washers being perforated in positions of registry with one another to conjointly form a plurality of longitudinal channels, certain of said channels being adjacent the longitudinal axis of the stack and other of channels being spaced outwardly relative thereto, said channels communicating with one of the passages in the head at one end of the stack, means closing said channels at the other end of the stack, fluid conducting means formed by portions of the washer and spacer elements, said fluid conducting means extending into the stack from said other end thereof, means at said one end of the stack closing said fluid conducting means, there being filtering passages between the washers some of which connect the channels with the fluid conducting means, and others connect the outwardly spaced channels with the exterior of the filter stack.

5. In a filter for fluids, a head having passages therein, a bowl in the path of the fluid, a filter stack interposed between the passages and including superposed perforated washer elements and spacer elements therebetween having radially extending scraper arms, said perforated washer elements having concentrically arranged rings, connectors between and integral with the rings, said connectors being radial and corresponding connectors being aligned with each other and normally aligned with the scraper arms of the spacer elements thereby forming longitudinal partitions in the stack, said partitions and rings forming longitudinal fluid conducting means communicating with one of the passages of the head at one end of the stack, means closing said fluid conducting means at the other end of the stack, other fluid conducting means formed by portions of the perforated washer and spacer elements, said fluid conducting means extending into the stack from the last mentioned end thereof and spaced inwardly of the first mentioned fluid conducting means, means closing said other fluid conducting means at the end of the stack whereat the first fluid conducting means communicates with the passage in the head, means for securing the perforated washer elements against rotation, a rotatable stem arranged axially in the stack and engaged with the spacer elements to rotate same, means permitting longitudinal movement of the stem relative to the spacer elements, means for latching the stem in a position wherein the scraper arms of the spacer elements are aligned with the connectors, said latch being releasable by longitudinal movement of the stem in one direction, and yielding means for urging said stem in the opposite direction, said stem extending outwardly of the filter head.

6. In an edge type filtering stack, a plurality of perforated washer elements having concentric radially spaced rings, radial means connecting said rings, radially armed spacer elements between the perforated washer elements for spacing the latter apart to provide filtering passages therebetween, said members and radial arms normally forming partitions extending longitudinally of the stack, said partitions and rings forming longitudinal fluid conducting passages open at one end of the stack, means closing said passages at the other end of the stack, other fluid conducting passages bounded by portions of the perforated washer and spacer elements, said fluid conducting means extending into the stack from said other end, means closing the other fluid conducting passages at said one end of the stack, means holding the perforated washer elements against rotations, means for rotating the spacer elements relative to the perforated washer elements, and means for releasably latching the spacer elements in a position whereat the arm thereof are in alignment with the connectors.

7. In an edge type filter stack, a plurality of large perforated washer elements each of which comprises a pair of spaced concentric rings, and connectors connecting said rings together, the spaces bounded by arcuate portions of the rings and the connectors forming channels open at one end of the stack, said channels being substantially parallel with the axis of the stack, means retaining the perforated washer elements in fixed stacked relation, an axial shaft in the stack, separators received on the shaft and having radial arms interposed between the perforated washer elements, small perforated washer elements interposed between the separators and received on said shaft, said small perforated washer elements being on the same plane as respective large perforated washer elements and spaced from the inner concentric rings thereof, the perforations of said small washer elements being arranged to register and form longitudinal channels in the stack, means closing the channels of the stack at one end thereof, said means having openings therein, the space between the inner concentric rings and the small perforated washer element being in communication with said openings, means closing said space at the other end of the stack, and means adapted to prevent rotation of the small perforated washer elements relative to each other.

8. The device defined in claim 7 wherein the shaft is rotatable and adapted to rotate the separators relative to the large perforated washer elements.

9. In an edge type filter stack for fluids, a plurality of perforated washer elements each of which comprises a plurality of radially spaced rings and integral members connecting said rings together thereby forming fluid channels substantially parallel with the axis of the stack, means closing said channels at one end of the stack, said channels being open at the other end of the stack, means holding said perforated washer element against rotation, separators having radial arms interposed between the wheel elements to space adjacent perforated washer elements apart thereby providing filtering passages therebetween, an axial shaft on which said separators are received and which is adapted to rotate same, washers interposed between the separators, said washers being of smaller diameter than the diameter of the inner rings of the perforated washer elements and spaced therefrom, the space between the washers and the inner rings having a fluid connection with the exterior of the stack at said one end thereof, and means closing said space at said other end of the stack.

10. In a filtering stack of generally cylindrical contour, a plurality of stacked filter elements and rimless spacer elements interposed between said filter elements, said elements being apertured to form a plurality of longitudinally extending circumferentially spaced passages open at one end of said stack, means closing said passages at the other end of said stack, filtering areas on radially opposite sides of the passages, means spaced from the passages and providing communication between the internal filtering areas and the other end of the stack, and means for securing the elements of the stock together.

11. In a filtering stack, a plurality of superposed filtering elements, rimless spacer elements interposed between said filter elements, said elements being perforated to form longitudinally extending passages open at one end of the stack, means closing said passages at the other end of said stack, said passages being disposed about an internal portion of the stack, fluid conducting means in said internal portion of the stack and open at said other end thereof, means closing said fluid conducting means at said one end of the stack, there being filtering spaces between the filter elements for the flow of fluid between said conducting means and the passages, and other filtering spaces between said filtering elements for the flow of fluid between said passages and the exterior of the stack.

12. In an edge type filtering stack, a plurality of thin filter elements, thin rimless spacer elements between said filter elements, means for securing the elements together in the stack, said filter elements being perforated and the spacers being so formed as to provide fluid transmitting passages through the stack, certain of said passages being open at one end of the stack, means closing said passages at the other end of the stack, said filter stack having other passages which are open at said other end of said stack, and means closing said other passages at said one end of the stack, and filtering ducts between adjacent passages.

13. In a filter having inlet and outlet ducts, an edge type filter stack therein of generally cylindrical form and comprising a plurality of stacked filter elements and rimless spacer elements therebetween holding said filter elements in spaced relation to each other, the elements being so constructed and arranged as to form a plurality of longitudinally extending channels in the stack, one group of said channels being adjacent the axis of the stack, a second group thereof being adjacent the periphery of the stack in radially spaced relation to the respective channels of said one group, means closing the ends of both groups of channels at one end of the stack, said channels being connected with one of the ducts at the other end thereof, and a third group of channels disposed intermediately of those of said one group and those of the second group and open at said one end of the stack, means closing said intermediate channels at said other end of the stack, there being filtering passages between adjacent channels and between the second group of channels and the exterior of the stack.

14. In a filter stack, a plurality of perforated washer elements having peripheral rings, radial portions integral with the rings and aligned longitudinally in the stack, a plurality of circumferentially spaced rods extending longitudinally through the stack for supporting the perforated washer elements and holding said elements against rotation, rimless spacer elements between the perforated washer elements, said spacer elements having radial scraper arms extending substantially to the periphery of the perforated washer elements and between the rods, means for effecting rotation of the spacer elements; and means for limiting the rotation of the spacer elements whereby at one limit of movement the radial scraper arms are aligned with said radial portions, the last mentioned means also being adapted to limit rotation of the spacer elements and prevent the arms thereof from striking the rods.

PARKER G. COX.

CERTIFICATE OF CORRECTION.

Patent No. 2,365,525.   December 19, 1944.

PARKER G. COX.

It is hereby certified that error appears in the printed specification of the above numbered patent requiring correction as follows: Page 2, first column, line 7, for "wheel" read --perforated--; line 8, for "washers" read --washer--; and second column, line 68, for "scrap" read --scrape--; page 3, first column, line 71, claim 4, before "channels" insert --said--; page 4, first column, line 48, claim 9, after "the" second occurrence, insert --smaller diameter--; line 65, claim 10, for "stock" read --stack--; and that the said Letters Patent should be read with this correction therein that the same may conform to the record of the case in the Patent Office.

Signed and sealed this 26th day of June, A. D. 1945.

Leslie Frazer (Seal)　　　　　　　　　　　Acting Commissioner of Patents.